July 6, 1954  E. C. PINSENSCHAUM  2,682,749
HYDRAULIC APPARATUS FOR MOLDING LINERS IN JAR CLOSURES
Filed March 19, 1953  9 Sheets-Sheet 2

INVENTOR.
EDWIN C. PINSENSCHAUM
BY
Herschel C. Omohundro
attorney

July 6, 1954  E. C. PINSENSCHAUM  2,682,749
HYDRAULIC APPARATUS FOR MOLDING LINERS IN JAR CLOSURES
Filed March 19, 1953  9 Sheets-Sheet 4

INVENTOR.
EDWIN C. PINSENSCHAUM
BY
Herschel C. Omohundro
Attorney

July 6, 1954 E. C. PINSENSCHAUM 2,682,749
HYDRAULIC APPARATUS FOR MOLDING LINERS IN JAR CLOSURES
Filed March 19, 1953 9 Sheets-Sheet 5

INVENTOR.
EDWIN C. PINSENSCHAUM
BY
Herschel C. Omohundro
attorney

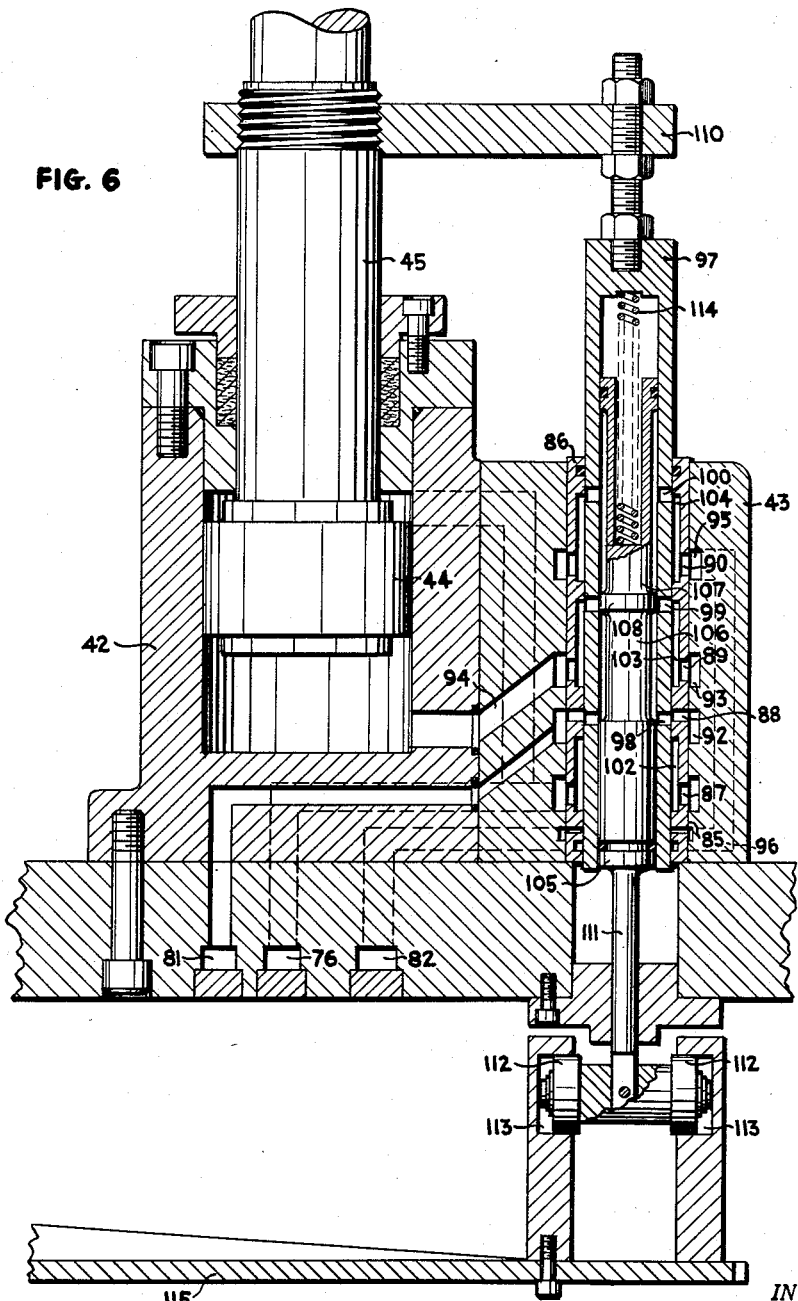

July 6, 1954  E. C. PINSENSCHAUM  2,682,749
HYDRAULIC APPARATUS FOR MOLDING LINERS IN JAR CLOSURES
Filed March 19, 1953  9 Sheets-Sheet 7
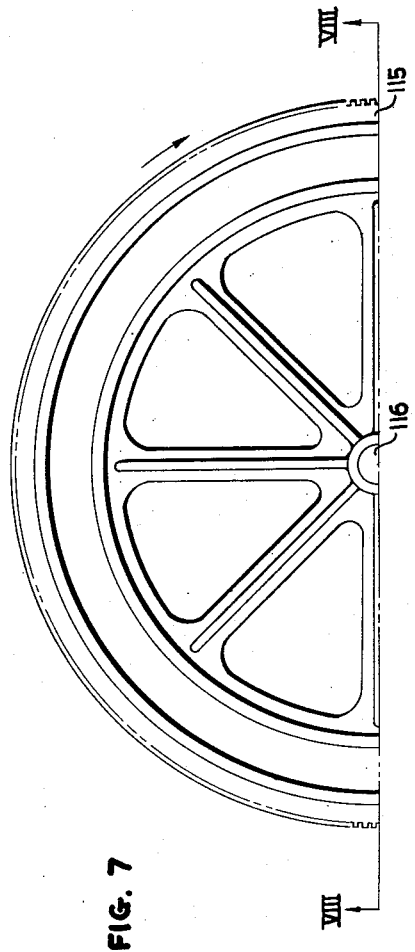
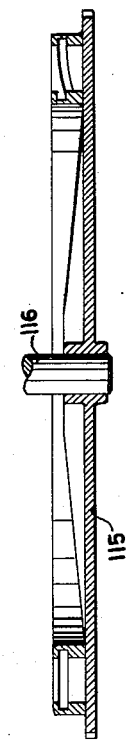
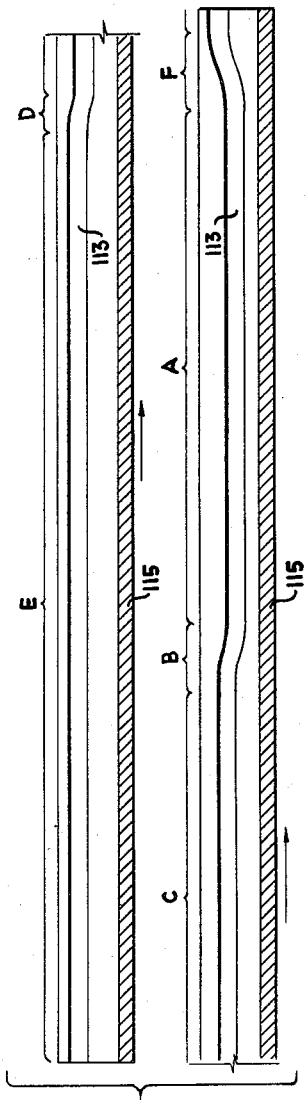
INVENTOR.
EDWIN C. PINSENSCHAUM July 6, 1954  E. C. PINSENSCHAUM  2,682,749
HYDRAULIC APPARATUS FOR MOLDING LINERS IN JAR CLOSURES
Filed March 19, 1953  9 Sheets-Sheet 8

INVENTOR.
EDWIN C. PINSENSCHAUM
BY
Herschel C. Omohundro
attorney

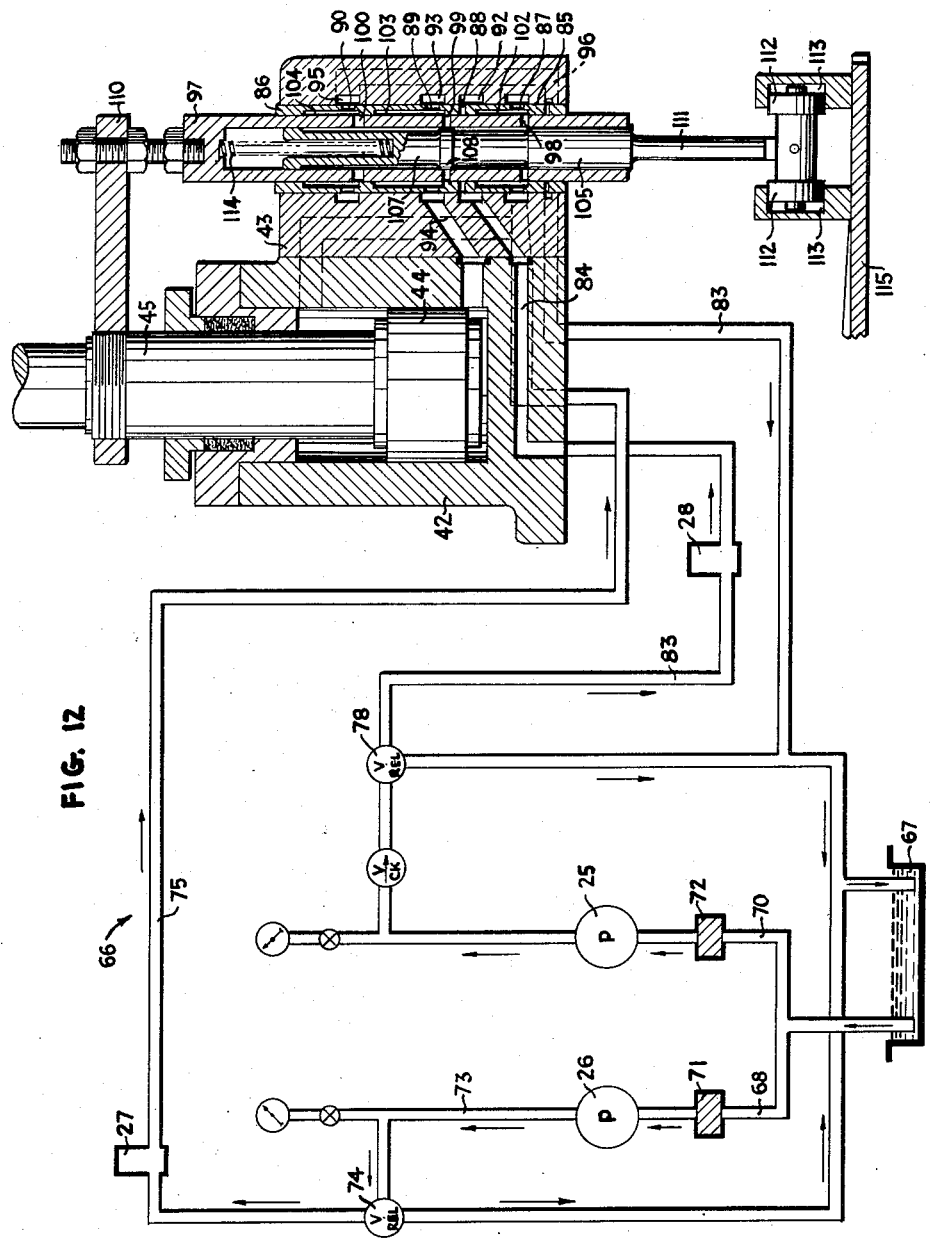

Patented July 6, 1954

2,682,749

UNITED STATES PATENT OFFICE 2,682,749

HYDRAULIC APPARATUS FOR MOLDING LINERS IN JAR CLOSURES

Edwin C. Pinsenschaum, Columbus, Ohio, assignor to The Denison Engineering Company, Columbus, Ohio, a corporation of Ohio Original application December 11, 1951, Serial No. 261,041. Divided and this application March 19, 1953, Serial No. 343,286

5 Claims. (Cl. 60—97)

This invention relates generally to hydraulic apparatus and more particularly to mechanism actuated hydraulically to apply a resilient lining to the inner sides of container covers. This application constitutes a continuation-in-part of my copending application Serial No. 143,680, filed February 11, 1950, entitled "Article Feeding Apparatus for Automatic Machines," and is a true division of my copending application Serial No. 261,041, filed December 11, 1951, entitled "Hydraulic Apparatus for Molding Linders in Jar Closures."

In the preservation of foods use is frequently made of glass or similar containers which are provided with metal covers. These covers are treated to prevent direct contact of the metal with the glass and to prevent the metal from contaminating the food. One method of treating the covers is to provide them with a thin lining of plastic material such as rubber or a composition thereof. The present invention resides in providing a machine for automatically securing the plastic lining to the covers in a quick facile manner.

An object of this invention is to provide a machine having a plurality of hydraulic pressing devices arranged in circular order, a feeding mechanism which functions to supply the covers consecutively to the pressing devices and a series of control mechanisms which are consecutively actuated to cause the operation of the pressing devices.

Another object of this invention is to provide a mechanism of the type mentioned in the preceding paragraph in which the pressing devices are stationarily arranged and the feeding mechanism revolves to select covers from a central supply station and transfer them to the pressing devices, the mechanism having a control actuating device operating in synchronism with the feeding device to effect the actuation of the pressing devices after the covers have been supplied thereto, the feeding mechanism also serving to discharge the treated covers prior to the introduction of other covers to be treated.

A further object of the invention is to provide a machine for applying a plastic lining to jar lids, the machine having a plurality of pressing heads arranged in circular order, a power cylinder in registration with each pressing head to operate the same, a servo-valve for each power cylinder to control the admission and discharge of operating fluid thereto and a ring-like cam track supported for rotary movement to effect the actuation of the servo-valves consecutively after the lids to be treated have been supplied to the pressing heads.

A still further object of the invention is to provide a novel servo-control valve mechanism for governing the flow of fluid pressure to the hydraulic power cylinders of the automatic machine mentioned in the preceding paragraphs, the valve mechanism being cam actuated and operative to cause the power unit controlled thereby to move its pressing head into operative position, dwell in this position for a time period long enough to permit a predetermined change to take place in the lining material and then to move to an inoperative position wherein the treated lid may be ejected and a new untreated one inserted.

It is a further object of the invention to provide an automatic machine for applying lining material to jar lids, the machine having a plurality of pressing dies arranged in a circle, mechanism for feeding the lids to be lined to the pressing dies, the feeding mechanism having a magazine disposed at the center of the circle on which the pressing dies are disposed and a starlike wheel which rotates about its own center and revolves around the magazine to select the caps one at a time from the magazine and transfer them to the pressing dies, the machine having hydraulic power cylinders for moving the pressing dies together to unite the lining material with the lids and a control valve for each of the power cylinders, the machine being further provided with a cam which moves in timed relation to the movement of the transfer wheel around the magazine to effect the actuation of the power cylinders and consequently the pressing dies as soon as the lids are placed in registration with the dies and the transfer wheel has withdrawn.

Further objects and advantages of the present invention will be apparent from the following description, reference being had to the accompanying drawings wherein a preferred form of embodiment of the invention is clearly shown.

In the drawings:

Fig. 6 is a similar view showing the mechanism of the power cylinder and valve in another condition of operation.

Fig. 7 is a partial plan view of a gear and cam mechanism used in the machine.

Fig. 8 is a vertical sectional view taken through the gear and cam on the plane indicated by the line VIII—VIII of Fig. 7.

Fig. 9 is a developed view of the cam shown in Figs. 7 and 8.

Fig. 12 is a diagrammatic view of the hydraulic circuit in connection with the power cylinder and control valve.

Figure 1:
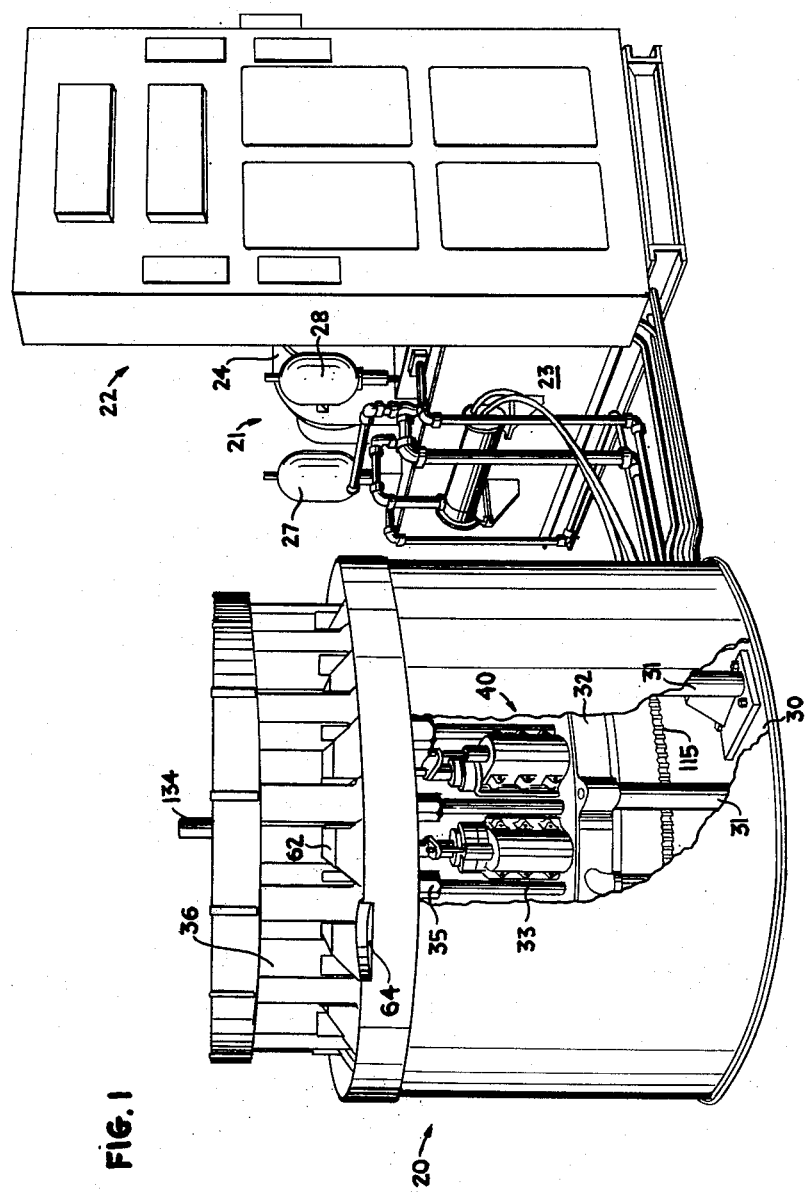
Fig. 1 is a perspective view of a machine formed in accordance with the present invention.

Referring more particularly to the drawings, the numeral 20 designates the automatic machine in its entirety and the numeral 21 generally designates the pumping mechanism which furnishes fluid pressure for the operation of the machine 20. Numeral 22 designates the control panel for the machine, this control panel containing gages, switches, and other apparatus used in controlling the operation of the machine 20. The pumping apparatus 21 includes a tank 23 and a motor 24 which is employed to drive high and low pressure pumps 25 and 26 which are shown only diagrammatically in Fig. 10. The pumping mechanism also includes accumulators 27 and 28 and a plurality of connected conduits which complete the circuit shown in Fig. 10.

The machine proper includes a base plate 30 and upwardly projecting legs 31 which are secured at their lower ends to the base plate and support a horizontal wall 32 at their upper ends. This wall in turn supports a plurality of vertical posts 33 which at their upper ends are threaded into another horizontal wall 34, hexagonal nuts 35 being provided on the posts 33 to maintain the position of the wall 34. This wall in turn supports a plurality of blocks 36 which in turn support a ring 37, the upper ends of the posts 33 extending through the blocks and the ring 37 and being provided with nuts 38 at their upper ends to secure the ring 37 in place. The plate 30, the legs 31, the disk 32, posts 33, disk 34, blocks 36 and ring 37 form a framework on which the operating mechanism of the machine is supported.

Figure 3:
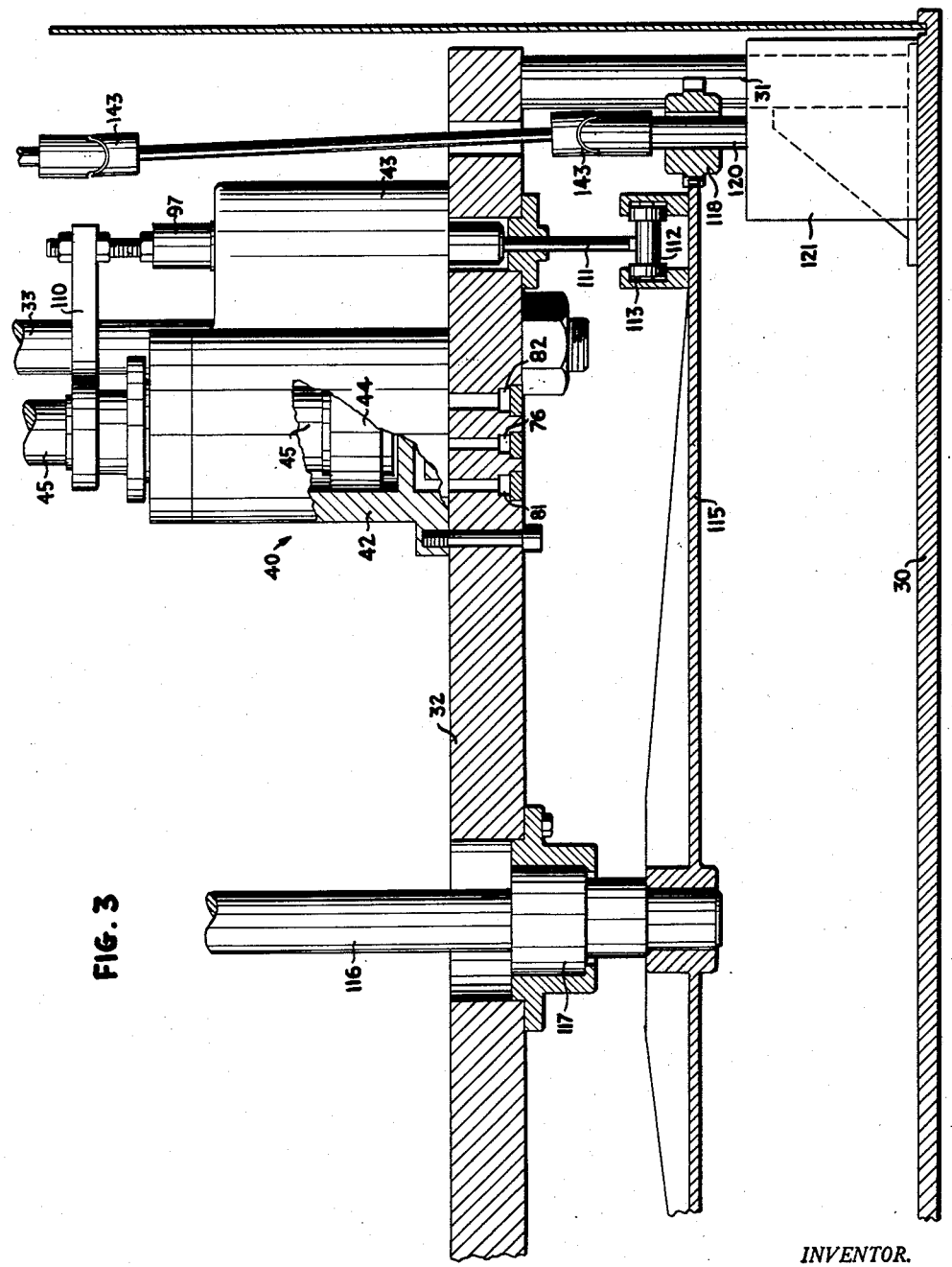
Fig. 3 is a similar view taken through the lower portion of the machine shown in Fig. 1.

Plate 32, as shown in Fig. 3, is provided with a plurality of power units which are designated generally by the numeral 40. These power units are arranged in a circle and are provided to effect the operation of pressing dies, designated generally by the numeral 41, also arranged in a circle above the disk 34, one set of pressing dies being in registration with each power unit 40. Each power unit includes a cylinder 42 and control valve assembly 43, these elements being disposed side by side and rigidly secured to the plate 32. The cylinder 42 has a piston 44 disposed for movement therein, the cylinder being arranged with its longitudinal axis extending vertically so that the ram 45 projecting from the piston 44 will extend upwardly and engage one section 46 of the pressing dies, the complementary section 47 of these dies being supported by the ring 37 in vertical registration with the section 46. It will be obvious that, when the piston 44 reciprocates in the cylinder 42, die section 46 will be moved toward and away from die section 47. These dies are suitably formed to effect the operation intended. In the present instance, the machine is adapted to apply lining material such as rubber or other suitable plastic to the inner surface of jar lids. The dies are, therefore, formed to accommodate such lids and exert pressure thereupon and on the lining material while heat is applied to effect a softening of the lining material. The mechanism for applying the heat may consist of any suitable heat generating or transferring mechanism; since it forms no part of the present invention, the heating mechanism has not been illustrated. In one embodiment of the invention, electrical resistance coils have been employed. These coils have not been illustrated since it is believed that they would merely confuse the application.

The die sections 46 and 47 comprise a plurality of parts which are formed to provide, when closed, a chamber 48 for the reception of a cap 50 to which lining material is to be secured. Part of the chamber 48 is formed in the lower die section 46 and constitutes a seat for the cap 50. The section 46 also includes a plunger 51 which is operated when the die sections are separated, to move the cap 50 from the seat so that it may be discharged from the machine. The die section 47 includes a piece 52 which engages the lining material in the cap and serves to force it into intimate engagement with the inner surface of the cap and spread this lining material over the inner surface of the cap when the material is softened by the application of heat. It has been found that better results may be secured when the chamber 48 is evacuated, so, the upper die section 47 is provided with passages 53 through which the air may be withdrawn from the chamber 48. Passages 53 extend into the ring 37 and are connected to valve bores 54 also formed in ring 37. These valve bores receive valve member 55 which alternately operate to connect the passages 53 with manifolds 56 and 57, one of which is evacuated and the other contains air at atmospheric pressure.

Figure 2:
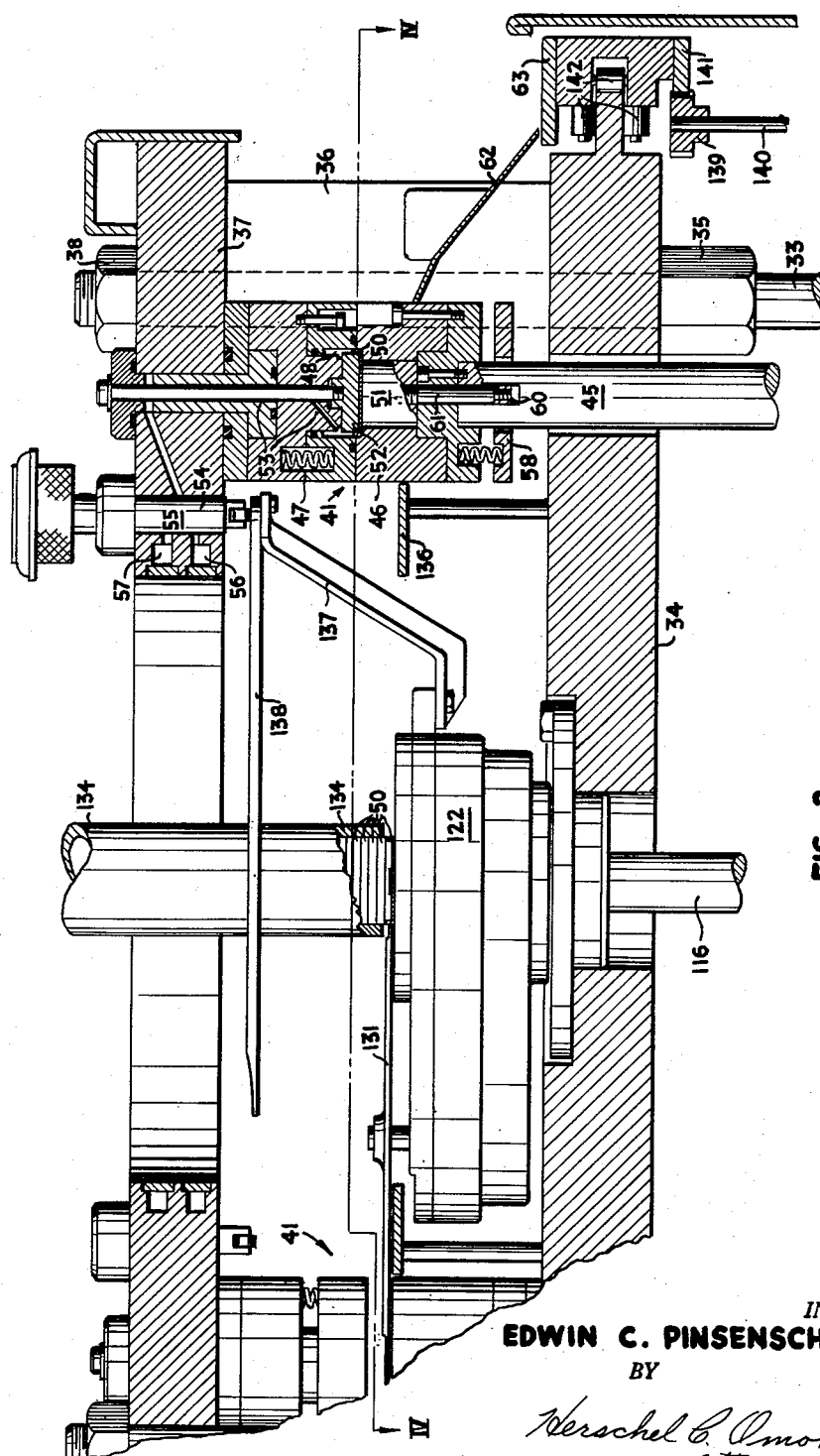
Fig. 2 is a vertical transverse sectional view taken through the upper portion of the machine shown in Fig. 1.
Figure 4:
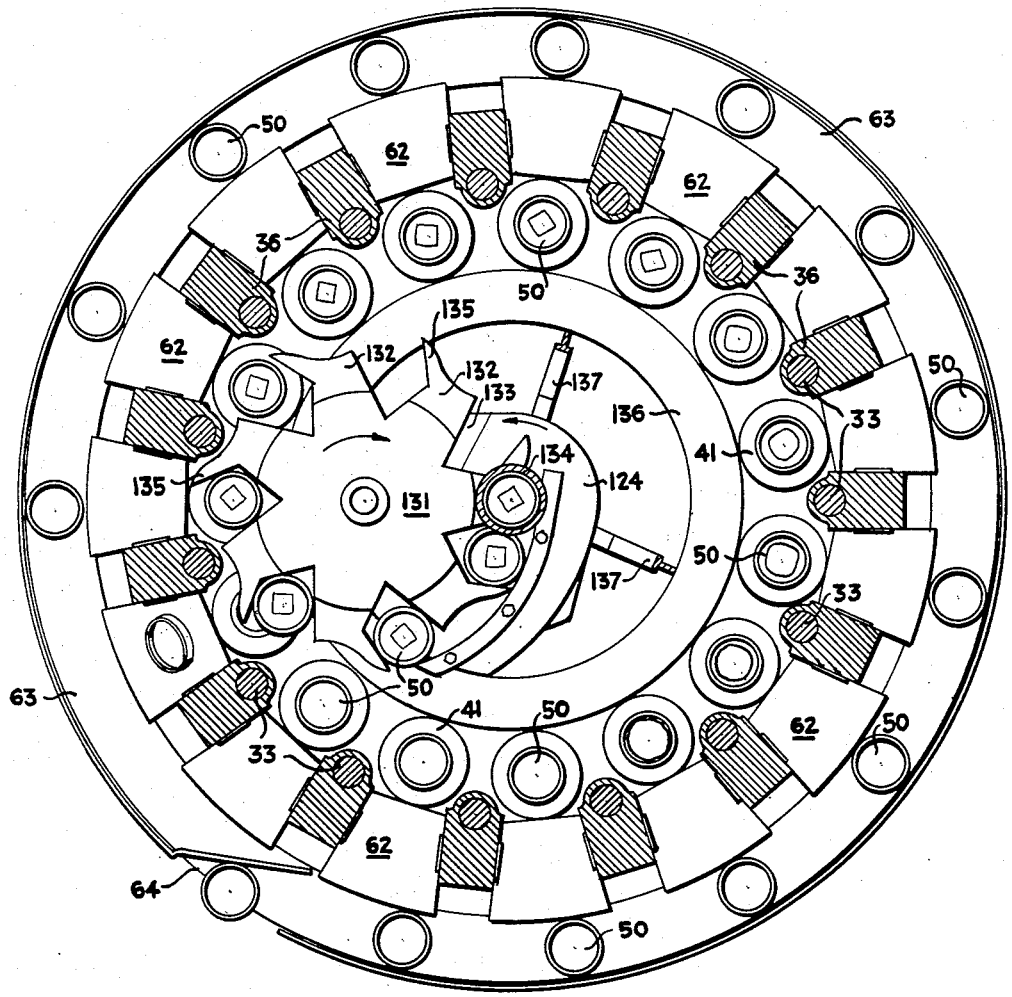
Fig. 4 is a horizontal sectional view taken through the upper portion of the machine shown on the plane indicated by the line IV—IV of Fig. 2.
Figure 5:
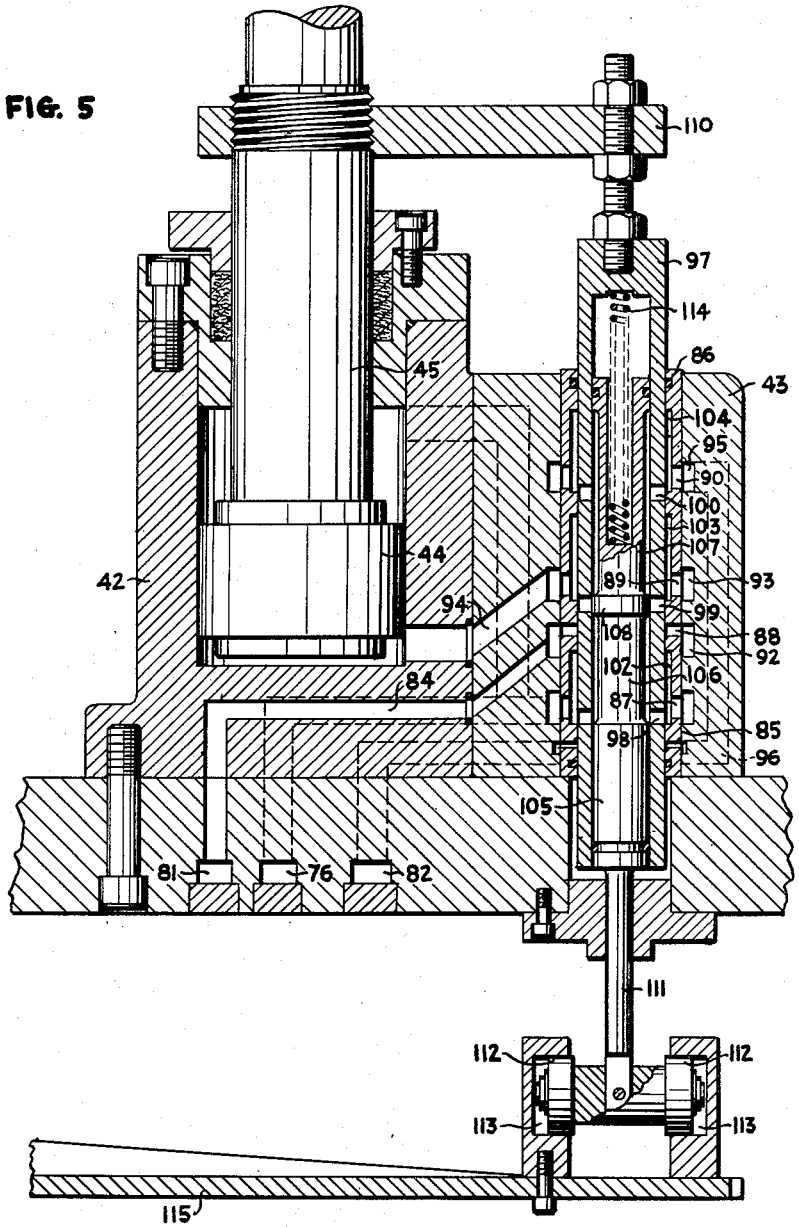
Fig. 5 is a vertical sectional view taken through one of the power cylinders and its control valve, the power cylinder being used to move a die section to effect a pressing operation on the closures lined by the machine.

In Fig. 2, the die sections are shown in their closed condition with a cap in position therein. When the die sections are separated, the cap 50 will move downwardly with the die section 46 until a ring 58 surrounding the ram 45 engages the frame disk 34. This ring 58 is connected by a bar 60, extending crosswise through a slot in the ram 45, and a stem 61, passing upwardly through the upper portion of the ram 45 and die section 46, with the plunger 51. Therefore, when the ring stops moving downwardly, the plunger and cap also stop. Continued movement of the ram and die section 46 then permits the cap to remain seated on the upper end of the plunger spaced above the die section 46. When the cap is so disposed, it may be dislodged by mechanism, to be described, onto an inclined slide 62 which discharges the cap onto a conveyor ring 63 which is supported for movement around the disk 34 to carry the caps to a point of discharge, indicated in Figs. 1 and 4 by the numeral 64. The ram 45 and the piston 44 with which it is connected are operated by hydraulic pressure. This pressure is generated by the pumping mechanism 21 and is supplied to the machine through conduits which form the hydraulic system designated generally in Fig. 12 by the numeral 66.

This system includes a reservoir 67, pumps 25 and 26 which draw fluid from the reservoir 67 through conduits 68 and 70. These conduits contain filters 71 and 72 so that fluid drawn from the reservoir may have the foreign material removed therefrom. Pump 26 discharges fluid into line 73, this line containing a relief valve 74 to limit the pressure developed by the pump. From valve 74, the fluid is conducted through line 75 to a manifold 76, see Fig. 3, formed in frame disk 32. Pump 25 discharges fluid through line 77 to a second relief valve 78 and fluid from this valve flows through a line 80 to a second manifold 81 also provided in frame disk 32. Manifold 76 is a low pressure manifold while manifold 81 constitutes a high pressure manifold. A third manifold 82 is provided in disk 32 this manifold constituting an exhaust manifold and being connected by exhaust line 83 with the reservoir 67.

Each power cylinder has its upper end connected by passages, formed in bodies 42 and 43, with the low pressure manifold 76. This arrangement provides for the application of fluid under low pressure at all times to the upper ends of the pistons 44. This fluid tends to retain pistons 44 in their lowered or retracted positions. The high pressure manifold 81 is connected by passages 84 with a valve bore formed in a body 43, this body constituting the valve casing. The bore 85 is provided with a liner 86 in which ports 87 to 90, inclusive, are spaced longitudinally. Ports 87 establish communication between the interior of liner 86 and a groove formed in body 43, this groove being in communication with the low pressure manifold. Ports 88 in liner 86 establish communication between a groove 92 which groove is connected by passage 84 with the lower end of the power cylinder and ports 90 are connected with a groove 95, this groove being connected by passage 96 with the manifold 82, this manifold being connected by line 83 with the reservoir 67. The sleeve 86 slidably receives a tubular valve element 97 which is provided with spaced sets of ports 98 to 100, inclusive. These ports register with elongated grooves 102 to 104, inclusive, formed internally in the liner 86. The grooves 102 to 104, inclusive, are of considerable length so that, as the sleeve 97 moves, communication between certain of the ports and certain grooves will be maintained. Sleeve 97 in turn slidably receives a valve spool 105, this spool being provided with a pair of external grooves 106 and 107.

In the normal positions of sleeve 97 and spool 105, a head 108 on the spool between the grooves 106 and 107 blocks port 99 in sleeve 97 thus preventing communication between ports 99 and either of ports 98 or 100. With the arrangement of ports and passages as shown and described, fluid under low pressure is constantly supplied to grooves 96 and 102 while fluid under high pressure is constantly supplied to groove 92. When the power cylinder is inactive and in a retracted position, the piston 44 therein will be maintained at the lower end of the power cylinder by fluid under low pressure applied to the upper end of the piston.

When it is desired to elevate the piston to effect a pressing operation, valve spool 105 is moved upwardly to establish communication through ports 98, groove 106 and ports 99, between groove 102 and groove 103 which is connected by ports 89, groove 93 and passage 94 with the lower end of the power cylinder. The differential in area between the lower and upper ends of the piston will cause greater force to be applied to the piston to urge it in an upward direction even though fluid at the same pressure is supplied to both ends of the power cylinder. As the piston moves in an upward direction, it will cause similar movement to be imparted to the sleeve 97 since this member is connected by an arm 110 with the ram 45. The rate of movement of the piston will depend upon the rate of movement of the spool 105. Spool 105 is actuated by the cam shown in Figs. 7 to 9, inclusive, spool 105 having a depending stem 111 which is provided at its lower end with a pair of rollers 112, these rollers being received in cam slots 113 provided in complemental sections of the cam.

The pattern of the cam is shown in detail in Fig. 9. It includes six sections designated by the letters A to F, inclusive. The cam pattern has been selected to effect the following sequences of operation of the power cylinders. In section A, the cam retains the valve spool in position to maintain the piston in its lowered position. While in this position, the die sections are spaced so that lined caps may be removed and caps to be treated inserted between the die sections. Section B of the cam is formed to effect a quick elevation of the spool 105 to cause a similar movement of the piston 44 and a quick closing of the dies under a relatively low pressure. Due to the construction of the control valve mechanism as shown and described, the piston and ram of the power cylinder substantially duplicate the movement of the spool 105, the movement of these elements occurring almost simultaneously. The section C of the cam is so constructed that the spool 105 will be elevated sufficiently to cause the piston and ram to move sleeve 97 upwardly until ports 98 almost reach the upper end of groove 102. These elements will then be held in this position by cam section C. Section C of the cam maintains the spool in position to hold the piston in a stationary position with the dies closed but without exercising very much force on the cap; during this time the chamber for the cap is evacuated by suitable mechanism, to be described later. The cam section D is shaped to cause additional upward movement of the spool to effect the application of high pressure fluid to the lower end of the piston 44 and cause the die sections to exert a high degree of pressing force on the cap and lining material. The cam section D is shaped to cause the spool to move upwardly from the position to which cam section B moved it. The additional upward movement of the spool causes the piston and ram to also move an additional distance upwardly and in so moving to move sleeve 97. This additional movement of sleeve 97 interrupts communication between ports 98 and groove 102 and establishes communication between such ports and groove 103. Inasmuch as the latter groove is connected with the source of high pressure, the force tending to move piston 44 upward will be increased. This exertion of increased force is maintained by the section E of the cam which holds the valve spool in its elevated position or continues to move the same gradually in an upward direction to cause additional upward movement of the ram to compensate for the compression and spreading of the lining material as it softens. The last section of the cam, designated by the letter F, causes a quick downward movement of the spool 105 which moves the head 108 to a position below the ports 99 establishing communication between grooves 103, 107 and 104 through ports 99 and 100. This arrangement of ports and grooves connects the lower end of the power cylinder with the reservoir so that fluid under low pressure on the upper end of the piston may move the piston downwardly causing a quick opening of the die sections.

When the cam follower rollers 112 reach the downwardly directed portions of the cam, the spool and the rollers are assisted in moving downwardly by a coil spring 114 disposed in the valve between the inner end of sleeve 97 and the inner end of a socket formed in spool 105. As previously pointed out in the description of a stage of downward movement of the lower die section, the cap is released and placed in position to be discharged. Due to the connection of the sleeve 97 with the ram and piston, the rate of downward movement will be controlled by the shape of the cam in the same manner that the upward movement of the ram was controlled. The rate of movement and the length of periods of rest of the piston to permit discharge and insertion of the lids, the evacuation of the chamber in the die and the pressing of the material during the softening period are all designed to facilitate the process of making the caps. These features may be varied depending upon the operations performed by the machines.

It will be apparent from the drawings that the forming dies and the power cylinders are disposed in circular order and that they are stationarily mounted with respect to the frame of the machine.

Figure 10:
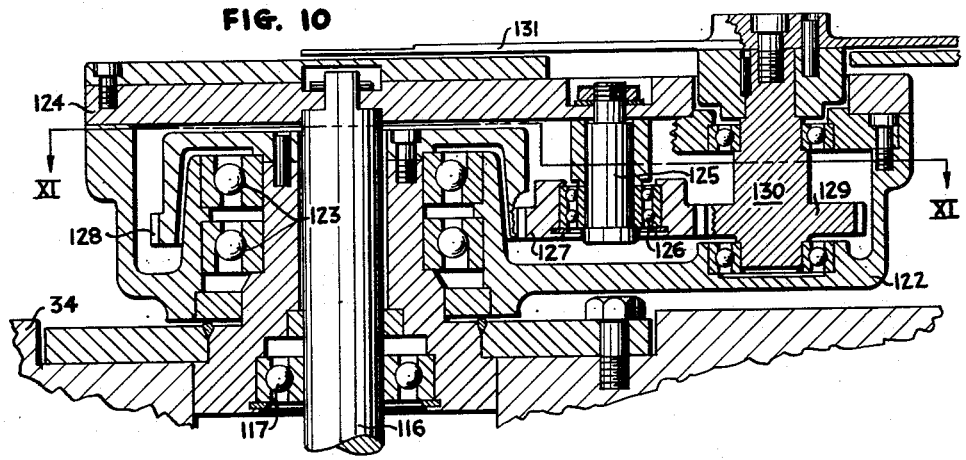
Fig. 10 is a vertical sectional view taken through the mechanism for operating a feeding apparatus forming part of the machine.
Figure 11:
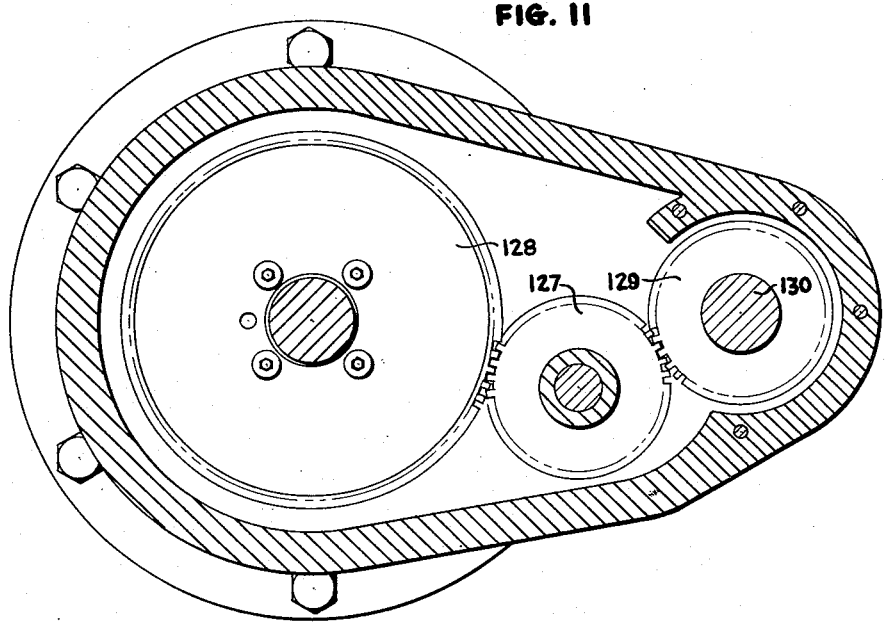
Fig. 11 is a horizontal sectional view taken through the mechanism shown in Fig. 10 on the plane indicated by the line XI—XI of that figure.

To effect the insertion and removal of the caps or lids between the die sections, a novel feeding mechanism has been provided. This feeding mechanism forms the subject matter of the copending application Serial No. 143,680, mentioned previously, the mechanism shown herein being modified slightly to secure improved operation. The feeding mechanism includes a motion transmitting gear 115, see Figs. 3, 5, 6, 7 and 8, which forms the support for the cam members 113, the gear 115 being secured to the lower end of a shaft 116 which is journalled in bearings 117 carried by the frame disks 32 and 34. Gear 115 is disposed in meshing relationship with a pinion 118 carried by a stub shaft 120 which projects from a motion transmitting gearing 121; this gearing may be driven in any suitable manner and is merely diagrammatically illustrated herein. As shown in Fig. 10, shaft 116 is connected at its upper end with the feeding mechanism proper, this mechanism including a housing 122 which is journaled for rotation on bearings 123 carried by a hub projecting upwardly from a plate carried by the frame disk 34. The housing 122 includes a top plate 124 which is suitably secured to and revolves with shaft 116. Since the top plate 124 is rigidly connected to the housing 122, these elements will revolve on the bearings 123 when shaft 116 revolves.

Top plate 124 has a shouldered shaft 125 secured thereto, which shaft supports bearings 126 for rotatable support of a pinion 127, this pinion meshing with a gear 128 which is secured against rotation on the hub on which the housing 122 is journaled. This gear 128 remains stationary, therefore, when the housing 122 revolves, pinion 127 will roll around the gear 128. As pinion 127 revolves, it transmits rotary motion to another gear 129 which is connected with or forms a part of a shaft 130 journaled in the housing 122 and cover 124. One end of this shaft 130 projects through the cover 124 and has secured to its upper end, through suitable mechanism, a star-shaped wheel 131. This wheel has a plurality of radially extending arms 132 projecting therefrom, the spaces between the arms forming pockets 133 for receiving the lids or covers 50 to be transferred from a magazine 134 to the dies 41. As the shaft 116 revolves, the housing 122 will revolve with it moving the center of the star wheel 131 around the axis of the shaft. The magazine 134 is disposed in registration with the axis of the shaft. Rotary movement of the housing 122 about the axis of the shaft 116 causes rotary movement of the shaft 130 to which the star wheel 131 is secured. It will be noted from Fig. 4 that the housing 122 rotates in a counterclockwise direction and at the same time the star wheel 131 rotates in a clockwise direction. The combined movement of the housing and the star wheel causes the successive presentation of the pockets 133 in the star wheel to the dies 41, the size of the star wheel and the location of the shaft 130 being so calculated that the pockets 133 will successively register with the magazine 134 and upon continued rotation will be brought into registration with the seats in the lower die sections. The features of the present feeding mechanism construction are the same as in applicant's copending application Serial No. 143,680, mentioned previously. The star wheel in the present application is slightly modified by having the ends of the arms terminate in lateral projections 135; these lateral projections and the ends of the arms are curved to clear the blocks 36 as the feeding mechanism revolves, the lateral projections serving the purpose of moving the finished caps from the dies 41. The arms move the caps to be treated one at a time from the bottom of a stack in the magazine 134 then these caps are transferred by the star wheel to the dies 41. Due to the fact that the star wheel in effect rotates within the circle on which dies are located, the pockets or the arms at the sides thereof, carry the caps to the seats in the dies then move away from the caps leaving these caps in position in the dies. Although the star wheel moves constantly, the caps come to rest in registration with the dies without any tendency to move beyond the dies. A stationary ring 136 is provided in the upper portion of the machine to form a surface on which the caps slide when moving from the rotating plate 124 to the dies.

The housing 122 is provided at several points with brackets 137 which project upwardly and outwardly from the housing and support a cam 138 at their upper ends. This cam serves to actuate valves 55 which control the establishment and interruption of the vacuum in the chambers in the die sections. The cam 138 is so formed that the vacuum will be established at the proper time after the die sections have been moved into engagement, the die sections having seals provided at appropriate points to prevent the loss of vacuum.

Rotary motion is imparted to the collector ring 63 by a gear 139 carried by a shaft 140; the gear 139 meshes with the teeth upon a ring gear 141 which is secured in any suitable manner to the ring 63, this ring being provided with rollers 142 to support the ring at the outer edge of the table disk 34. Shaft 140 has a number of universal joints 143 and is connected with the stub shaft 120 so that the collector ring 63 will revolve at the proper rate to remove the formed lids after they have discharged from the dies.

While the form of embodiment of the present invention as herein disclosed constitutes a preferred form, it is to be understood that other forms might be adopted, all coming within the scope of the claims which follow.

I claim:

1. Control mechanism for a hydraulic cylinder with a piston having differential areas comprising a pair of fluid sources at different pressures; passage means constantly exposing the smaller piston area to fluid from the source of lower pressure; valve means having a plurality of elements normally disposed to prevent communication between either of said pressure sources and the larger piston area, the first and second said valve elements being independently movable relative to the others; extraneously controlled means for moving the first of said movable valve elements to first establish a connection between the source of lower pressure fluid and the larger piston area and cause movement of said piston; and a connection between said piston and the second movable valve element, operation of said piston tending to move said second valve element to interrupt the application of fluid pressure to said larger piston area, movement of the first movable valve element beyond a predetermined extent establishing communication between the source of higher pressure fluid and said larger piston area, reverse movement of said first movable valve element establishing communication between the larger piston area and exhaust to reverse the direction of movement of said piston.

2. Control mechanism for a hydraulic cylinder with a piston having differential areas comprising a pair of fluid sources at different pressures; passage means constantly exposing the smaller piston area to fluid from the lower pressure source; valve means having a casing with spaced ports communicating, respectively, with said low pressure source, said high pressure source, said larger piston area and exhaust; first and second valve elements disposed for movement in said casing relative to each other, said elements being normally relatively positioned to prevent communication between said ports; extraneously controlled means for moving the first valve element in one direction from its normal position relative to said second element to establish communication between the ports connected with said low pressure source and said larger piston area to cause operation of said piston; and a connection between said piston and said second valve element, operation of said piston serving to move said second valve element to re-establish the normal relative positions of said first and second valve elements, said valve elements being movable to a position to establish communication between the ports connected with said larger piston area and said higher pressure source, movement of said first valve element in the opposite direction from its normal position relative to said second element establishing communication between the ports connected with said larger piston area and exhaust.

3. Control mechanism for a hydraulic cylinder with a piston having differential areas comprising a pair of fluid sources at different pressures; passage means constantly exposing the smaller piston area to fluid from the lower pressure source; valve means having a casing with spaced ports communicating, respectively, with said low pressure source, said high pressure source, said larger piston area and exhaust; telescoping first and second valve elements disposed for movement in said casing relative to each other, said elements being normally positioned relative to one another to prevent communication between the ports in said casing; extraneously operated means for moving the first element in one direction from its normal position relative to said second element to establish communication between the ports connected with said low pressure source and said larger piston area to cause said piston to move in a predetermined direction; and a connection between said piston and said second valve element, movement of said piston in said predetermined direction serving to move said second valve element to tend to interrupt the communication established by movement of said first piston, movement of said valve elements in said predetermined direction a predetermined extent serving to establish communication between the ports connected with said high pressure source and said larger piston area, movement of said first valve element in the opposite direction serving to establish communication between the ports connected with said larger piston area and exhaust to cause movement of said piston in a direction opposed to said predetermined direction.

4. Control mechanism for a hydraulic cylinder with a piston having differential areas comprising a pair of fluid sources at different presures; passage means constantly exposing the smaller piston area to fluid from the lower pressure source; valve means having a casing with spaced ports communicating, respectively, with said low pressure source, said high pressure source, said larger piston area and exhaust; inner and outer valve elements disposed for movement in said casing relative to each other, said elements normally being positioned relative to one another and said casing to prevent communication between the ports in said casing; cam means for moving said inner valve element in one direction from its normal position relative to said outer valve element to establish communication between the ports connected with said low pressure source and the larger piston area to cause said piston to move in a predetermined direction; a connection between said piston and the outer valve element, movement of said piston in said predetermined direction serving to move said outer valve element to tend to restore the normal relative positions of said inner and outer valve elements and interrupt the communication established; and movement of said valve elements to a predetermined point serving to establish communication between the port connected with said higher pressure source and said larger piston area, said cam being shaped to cause said inner valve element to move in a reverse direction to establish communication between ports connected with the larger piston area and exhaust.

5. Control mechanism for a row of hydraulic cylinders, each of which has a piston with differential areas comprising a pair of fluid sources of different pressures; passage means constantly exposing the smaller areas of said pistons to fluid from the source of lower pressure; a valve means for each of said hydraulic cylinders, each valve means having a plurality of relatively movable valve elements normally disposed to prevent communication between either of said pressure sources and the larger piston area; continuously movable cam means for successively moving the first element of each valve means to first establish a connection between the source of lower pressure and the respective larger piston area to cause movement of said pistons; a connection between each piston and the second element of the valve means therefor, operation of each piston tending to move such second element of the respective valve means to interrupt the application of fluid to said larger piston areas, movement of the first elements of the valves beyond a predetermined point establishing communication between the source of higher pressure fluid and said larger piston areas, said cam being so shaped as to successively move said first valve elements to establish communication between the larger piston areas and exhaust to reverse the direction of movement of said pistons.

References Cited in the file of this patent

UNITED STATES PATENTS

| Number | Name | Date |
|---|---|---|
| 1,904,864 | Jongedyk | Apr. 18, 1933 |
| 2,356,366 | Wise | Aug. 22, 1944 |